United States Patent [19]
Nielsen

[11] Patent Number: 5,268,800
[45] Date of Patent: Dec. 7, 1993

[54] DISK DRIVE SERVOSYSTEM USING GRAY CODE

[75] Inventor: Tab C. Nielsen, Sunnyvale, Calif.

[73] Assignee: Areal Technology, San Jose, Calif.

[21] Appl. No.: 611,500

[22] Filed: Nov. 13, 1990

[51] Int. Cl.$^5$ .......................... G11B 5/58; G11B 5/596
[52] U.S. Cl. .................... 360/77.01; 360/77.05; 360/77.04; 360/77.08
[58] Field of Search ............... 360/78.14, 77.07, 77.08, 360/77.11, 77.04, 77.05, 77.02, 77.01, 78.06

[56] References Cited

U.S. PATENT DOCUMENTS

| | | | |
|---|---|---|---|
| 4,872,074 | 10/1989 | Brown et al. | 360/77.07 |
| 4,878,135 | 10/1989 | Makino et al. | 360/77.07 |
| 4,977,472 | 12/1990 | Volz et al. | 360/78.14 |

Primary Examiner—Aristotelis Psitos
Assistant Examiner—Varsha V. Sheladia
Attorney, Agent, or Firm—Nathan N. Kallman

[57] ABSTRACT

A servosystem for controlling position of a magnetic head relative to a magnetic storage disk in a disk drive includes first and second feedback loops which provide head position error signals. The first feedback loop includes a head position circuit that processes different recorded Gray coded binary expressions that identify the data tracks on the disk during a track seek mode. The second feedback loop includes a head position circuit which, during the seek and track following modes, processes recorded quadrature servo signals that are interleaved with the data tracks.

8 Claims, 3 Drawing Sheets

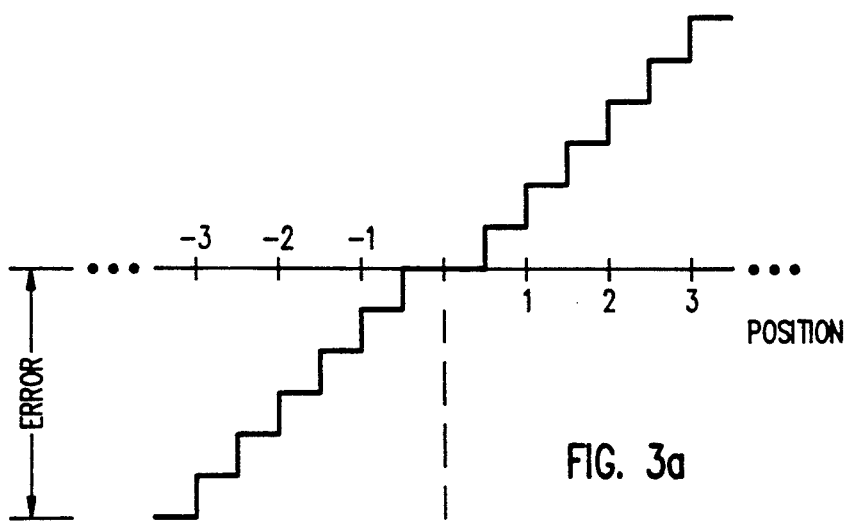
FIG. 3a
PRODUCED BY QUADRATURE PATTERNS
FIG. 3b  QUADRATURE (½ TRACK)
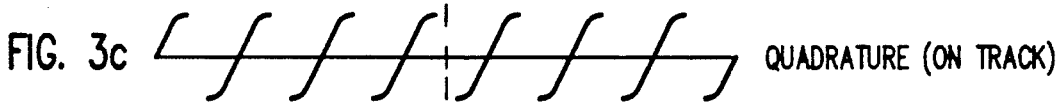
FIG. 3c  QUADRATURE (ON TRACK)
COMBINED SIGNAL
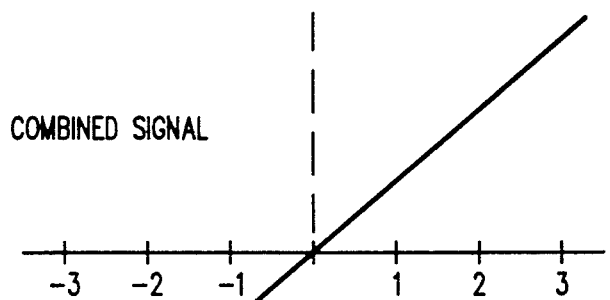
FIG. 3d
SEEK FEED FORWARD
FIG. 3e
FIG. 3f

DISK DRIVE SERVOSYSTEM USING GRAY CODE

FIELD OF THE INVENTION

This invention relates to a servosystem for controlling a head actuator in a disk drive.

BACKGROUND OF THE INVENTION

Description of the Prior Art

Disk drives for storing data include one or more magnetic heads or transducers that are moved during an accessing or seek mode to selected data tracks by means of a head actuator, such as a voice coil motor. During the seek mode, the head actuator follows a position profile that is stored in a microprocessor, by way of example. The velocity profile is used to compare the actual position of the head during accessing to the desired track position provided by the microprocessor.

As disk drive technology progresses, disk drives are made more compact and the spacing between the concentric data tracks are reduced to afford high track density and increased data storage capability. Servosystems are used to ensure that the heads accesses the selected data tracks in minimal time and that the head follows the center of the selected track very closely so that data will be properly recorded and read out. Prior to actual read/write (R/W) operation of the disk drive, a pattern of servo information signals are prerecorded or embedded on the surface of the magnetic disk. Typically the servo signals are recorded in a plurality of spaced sectors interleaved between the data tracks along the length of the concentric tracks. In a well known implementation of a servosystem used with disk drives, the servo field is formed in a checkerboard pattern of transitions which are aligned radially but are of opposite polarity at alternate tracks. The servo field comprises a quadrature pattern that is aligned with the data tracks. The interleaved tracks of the servo field are arranged so that the boundary between adjacent servo tracks is at the centerline of the data track between the servo tracks. By sensing the servo information with the R/W head, an indication of the position of the R/W head relative to the nearest track center is obtained and an on-track or off-track condition can be detected.

Each data track on the surface of the disk carries a personalized address mark to identify the tracks during the seek mode. The address mark may consist of three or more bytes having different combinations for each track. A problem that is encountered during the seek mode in high track density drives is the occurrence of noise and interference which results from the rapid changes of a plurality of bits of the address mark as the head moves radially across the tracks. As a result the information being read out can be erroneous. The circuitry for processing the address information and the servo information generally is relatively complex and costly to design, construct and maintain.

Prior art servosystems are generally limited to displacements from a selected track of +/−30% from the position profile, in relation to the number of data tracks, to be capable of proper accessing and track following of the track. Therefore if the head or transducer deviates in position beyond such limit, useful read or write functions cannot be implemented.

SUMMARY OF THE INVENTION

An object of this invention is to provide a simplified servo positioning system for a head actuator in a disk drive which is less complex and less costly than prior art servosystems.

Another object is to provide a high performance servosystem for the head actuator of a disk drive in which errors in the data being processed is effectively reduced.

Another object is to provide a servosystem in a disk drive which allows relatively large displacement of the head during track following without resulting in nonoperability.

According to this invention, a servosystem for controlling a head actuator of a disk drive system comprises a first feedback loop using Gray code signals that are processed during the seek mode to transport the magnetic head to selected tracks. The Gray code provides coded expressions of binary signals that sequentially differ track to track from a preceding expression in one place only. The coded expressions serve to identify the track number and whether the track is odd or even numbered. The Gray code thus provides an indication of the actual position of the head relative to a selected target track.

A second feedback loop provides quadrature servo signals that are processed, in a well-known manner, during the seek mode and track following mode in order to move the heads towards the center of the selected data track. By the combination of Gray code signals and quadrature signals, the servosystem affords a displacement of +/−500% and greater from the position profile without sacrificing operability and reliability of the disk drive.

BRIEF DESCRIPTION OF THE DRAWINGS

The invention will be described in greater detail with reference to the drawings in which:

FIGS. 3a-f are waveforms to aid in the explanation of the invention; and

DETAILED DESCRIPTION OF THE PREFERRED EMBODIMENT

Figure 1:
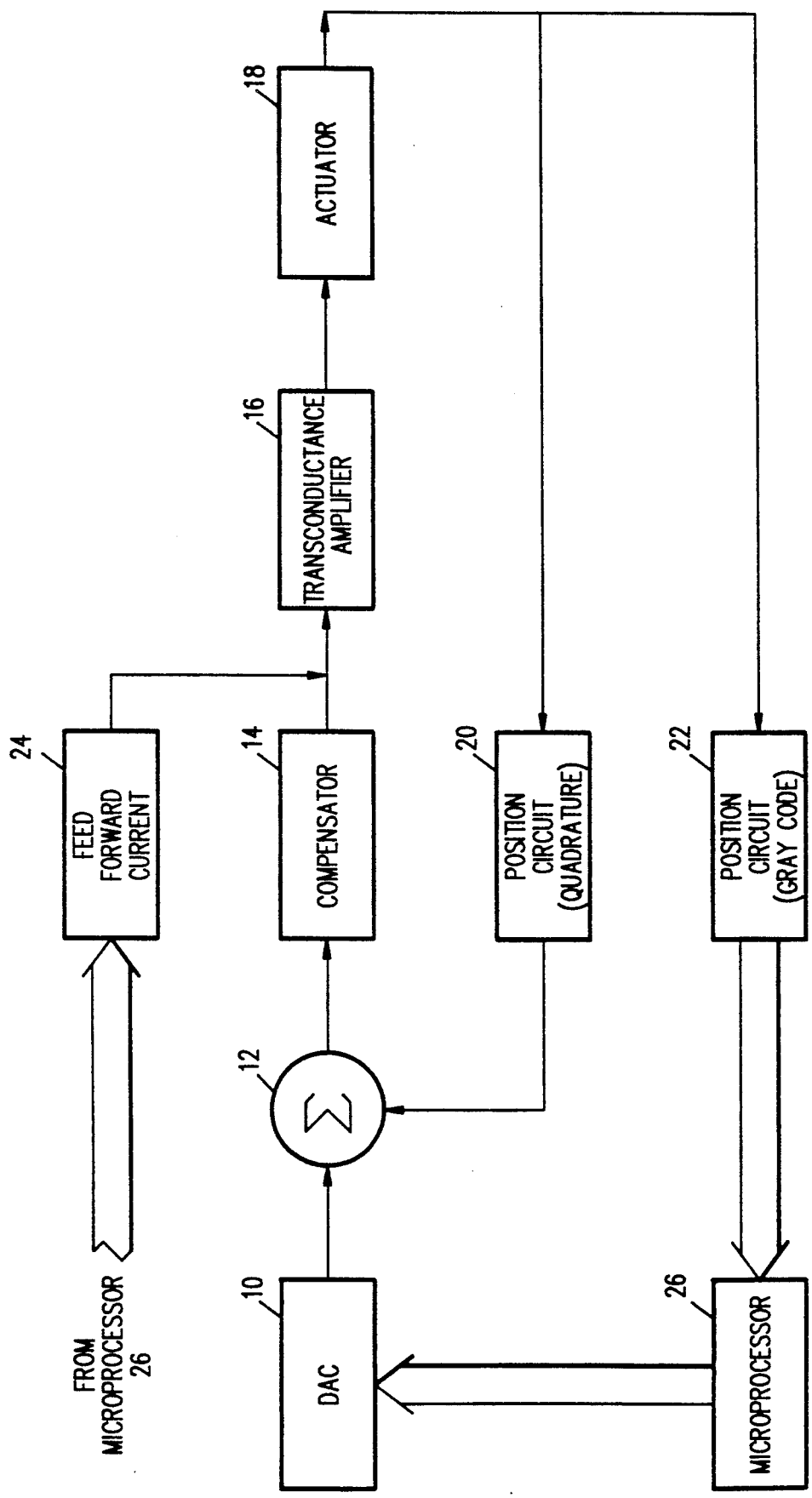
FIG. 1 is a block diagram illustrating the servosystem of the present invention.

With reference to FIG. 1, a servosystem for a disk drive includes a head actuator 18 that transports the magnetic head and transducer to selected tracks on the surface of a magnetic disk for recording and readout of data signals. In accordance with this invention, the transducing head senses Gray code signals and concurrently detects quadrature servo signals on-the-fly. During the seek or track accessing mode, as the head actuator 18 transports the head towards a target data track, that is delineated by a microprocessor 26, the head senses track and sector information and the Gray code binary coded expressions. The Gray code expression that is read out at any given time indicates the data track over which the head is flying, and the expressions change by one bit only as the head moves from one track to the next.

As the head is transported across the tracks, the sensed Gray code binary signal detected at each track is fed to a position circuit 22 that compares the actual track address with that of the target track selected by the microprocessor 26. The Gray code position circuit 22 provides a step voltage error signal (FIG. 3a) of a polarity indicating in which direction the head needs to be moved to arrive at the target track. The voltage error signal steps at each half track that is crossed and includes the polarities of the sensed flux reversals associated with the dibits of the Gray coded expressions which are coded in time.

The error signal is fed to the microprocessor 26 that compares the error signal to a position profile stored in the microprocessor. The resultant difference signal is provided to a digital-to-analog converter (DAC) 10 which contains head position information. The DAC 10 is connected to a first feedback loop that includes a summer 12, compensator 14, transconductance amplifier 16, the actuator 18, the Gray code position circuit 22 and microprocessor 26.

In operation, the microprocessor 26 feeds to the DAC 10 a binary signal representative of a selected track to be accessed. The binary signal is converted in the DAC to an analog output signal which represents the voltage difference between the desired track position and the actual position of the head, which is obtained through a first feedback loop including the Gray code position circuit 22. The DAC output signal is fed to the summer 12 which also receives an output from a quadrature position circuit 20 disposed in a second feedback loop. The summer 12 adds the output from the quadrature position circuit 20 to the output from the DAC 10 to produce a position error voltage signal that is passed to the compensator 14. The compensator includes three lead-lag circuits and an integrator that creates a stable closed loop system that holds the actuator in position. The position error signal is then directed to the transconductance amplifier 16. A feed forward current circuit 24 that receives signals from the microprocessor 26 provides a drive voltage (FIG. 3e), which is used only for seeks, that is applied to the amplifier 16 concurrently with the voltage received from the compensator 14. The position error signal voltage is converted to a drive current proportional to the error voltage by amplifier 16. The drive current from amplifier 16 serves to drive the head actuator 18 to the selected data track.

Figure 4:
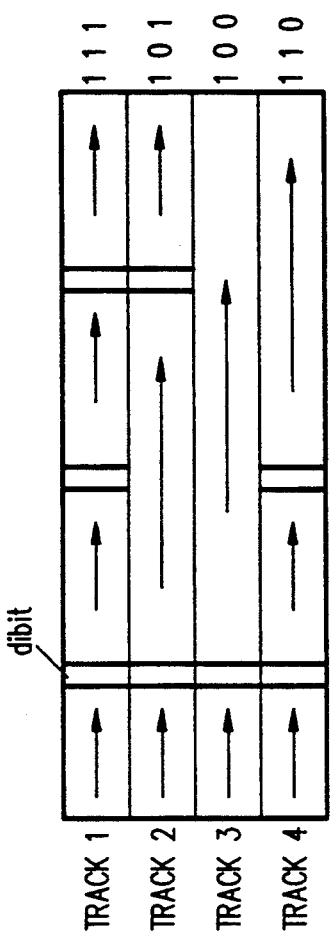
FIG. 4 is a representation of portions of four data tracks including Gray code transitions and dibits that are recorded on the data tracks.

During seek operation of the disk drive, the head follows a position profile stored in the microprocessor 26 so that the head is accelerated from the initial track until it reaches a track which is halfway to the selected target track, at which point the the head decelerates as it approaches the target track. As depicted in FIG. 4, the Gray code portion of each track sector includes dibit flux transitions along the data track. In this specific embodiment, about 1043 tracks are used on a 2.5" disk, each data track having 60 sectors, each sector of a data track having the same Gray code binary expression. Different permutations of eleven bits are used for each track to identify the data tracks. Each adjacent track has only one bit change in the sequence of Gray code binary expressions that are assigned to the tracks. The last bit of each Gray code binary expression indicates whether the track is odd or even numbered.

As the head moves towards the target track, the actual position obtained from the Gray code is compared to the position profile, as computed by the microprocessor, and a position error signal is developed (see FIG. 3a). A comparison is made of the quadrature pattern to develop 0.5 track resolution. If the A and B servo signals that are read are about equal, then the Gray code signal is read and processed directly. If the A or B servo signal that is detected is saturated, then the indication is that the head is off-track at about $+/-0.5$ track, depending upon whether the designated track is odd or even numbered. At the completion of the seek, the settle function is implemented in a similar manner. When the head is settled, the Gray code feedback loop is inactivated.

Figure 2A:
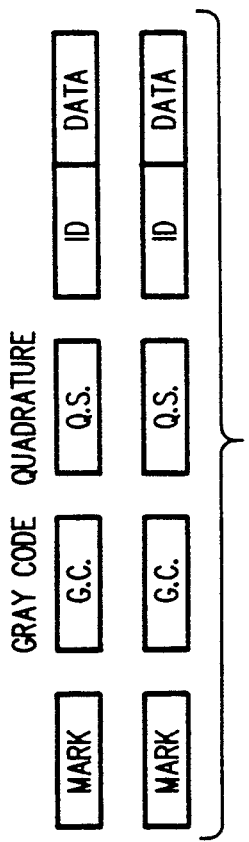
FIG. 2a shows portions of two data tracks and the arrangement of signals that are recorded on the tracks.
Figure 2B:
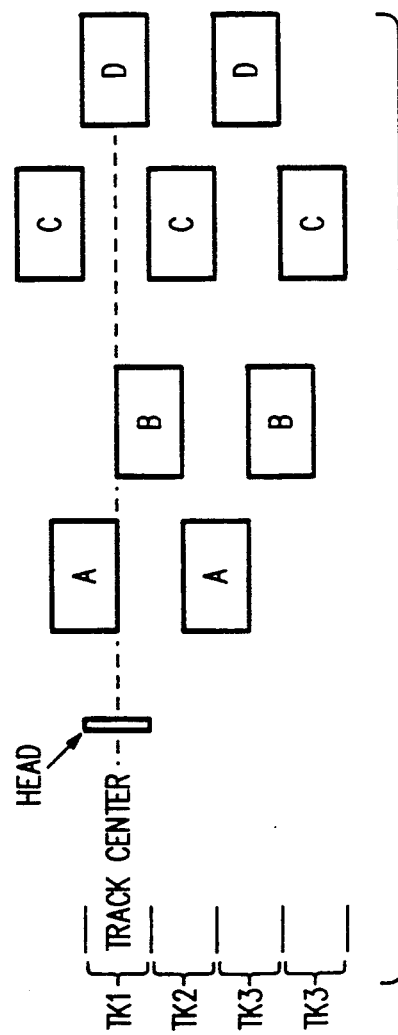
FIG. 2b represents portions of the quadrature servo signals as provided along the servo tracks interposed between the data tracks.

Concurrently with the functioning of the feedback loop using the Gray code, a second feedback loop processes the quadrature servo signals during the seek and track following modes. As shown in FIG. 2, the quadrature servo signals constitute A,B,C and D recorded signals which are prerecorded and embedded on the surface of the recording disk. The A and B signals are aligned with the track centers whereas the C and D signals are aligned with the track boundaries, as illustrated. The A and B signals are used for track following and to maintain the head transducer over the center of the data tracks. If the signal detected by the head represents the A recorded signal only or the B signal only, the output of the quadrature position circuit is an off-center error signal. The C and D signals are then detected and the polarity of the error signal that is produced is used to move the heads in the proper direction towards the center of the selected track.

The head actuator 18 senses the polarity of the C and D quadrature signals during the seek mode only and an indication in the form of a position error signal is provided when the head is in an off-track position. In an off-track condition, a quadrature pattern as shown in FIG. 3b is generated. However, if the head transducer is on-track and located between the A and adjacent B recorded positions, a quadrature signal pattern as shown FIG. 3c is seen at the output of the quadrature position circuit 20 and a zero error voltage output is obtained.

To process the quadrature signals obtained by the R/W head during the track following mode, the quadrature position circuit 20 receives the quadrature signals from the sensing head and provides a position error signal output to the summer 12. In addition to the quadrature position circuit 20, the quadrature error signal feedback loop includes the summer 12, compensator 14, amplifier 16 and head actuator 18, which are also used in the Gray code error signal feedback loop. The components of the quadrature signal closed feedback loop operate substantially the same as when operating in the seek mode with the Gray code position circuit 22 being active.

As shown in FIGS. 3b and 3c, quadrature position signals are generated at the output of the quadrature position circuit 20. The Gray code and quadrature position error signals, FIGS. 3a, 3b and 3c respectively are combined in the summer 12 to provide a linear voltage signal (FIG. 3d). The voltage is applied to the compensator 14 which produces an integrated output signal for application to the amplifier 16. The current from the feed forward current supply 24 (FIG. 3e) is added to the voltage generated by the compensator 16 into the transconductance amplifier 16 which provides a constant acceleration voltage signal to the actuator 18. A double integration function is effectuated by the amplifier 16 to transform the nominal value of the acceleration voltage to a position signal (FIG. 3f). Also, during the seek mode, the gain of the gain of the servo loop is adjusted to optimize the lineal curve (FIG. 3d) for best results and reliability and improved seek time, among other things. The gain control circuit, which is well known in the art, is not shown but is primarily included in the compensator circuit 14.

By combining Gray code information with quadrature servo information as disclosed herein, a linear position signal is derived with a simplified circuit, wherein the same components are used effectively in two feedback loops. During the seek mode, when a simple constant acceleration is employed, larger position errors than previously obtained can be tolerated with successful completion of the seek function. Therefore higher track density is realized and average access time is improved, and undesirable variations in the mechanical components of the drive are better tolerated.

The following 24 pages are provided to a software program is used by the microprocessor to implement the calculations and commands for track seeking and track positioning as disclosed herein. It should be understood that the circuitry disclosed herein is not limited to the parameters and dimensions described but may be modified within the scope of the inventive concept as defined by the claims.

What is claimed is:

1. In a disk drive, a servo system for controlling the position of a magnetic head driven by an actuator relative to data tracks on a magnetic disk during the seek and track following modes of operation of a disk drive comprising:

a first closed feedback path comprising said magnetic head and said actuator wherein said head is in transducing relation with said disk for detecting recorded signals on said disk;

said first feedback path including a first position circuit coupled to said head for receiving recorded Gray coded position signals recorded along the data tracks of said disk and for providing a head position error signal;

said first feedback path further including a microprocessor coupled to said first position circuit for providing selected track data and for comparing said position error signal to a position profile stored in said microprocessor; and a digital-to-analog converter coupled to said microprocessor for receiving a binary signal representative of a selected track to be accessed and for converting said binary signal to an analog signal;

a second closed feedback path including a second position circuit coupled to said head for receiving quadrature servo signals recorded along servo tracks of said disk, said servo tracks being interposed between said data tracks; said second feedback path including a summer coupled to said digital-to-analog converter and said second position circuit for summing head position error signals calculated in said first and second feedback paths; and means for compensating for the head position errors coupled to said summer, wherein said first position circuit is active during said seek mode and inactive during said track following mode.

2. A servosystem as in claim 1, including a transconductance amplifier coupled to said compensator for providing a drive current to said head.

3. A servosystm as in claim 2, including a feed forward current circuit coupled to said microprocessor for providing a drive voltage to said amplifier.

4. A servosystem as in claim 1, wherein said quadrature servo signals comprise alternating sequences of A,B,C and D recorded signals, said A and B signals being aligned with the centers of said data tracks and said C and D signals being aligned with the track boundaries.

5. A servosystem as in claim 1, wherein said Gray code position circuit is inactive during a track following mode.

6. A servosystem as in claim 1, wherein said Gray code position signals are recorded as binary expressions of eleven bits, each binary expression being different for each associated data track.

7. A servosystem as in claim 1, wherein said summer provides a linear output signal representing a position error voltage.

8. A servosystem as in claim 1, wherein said summer includes means for combining said Gray code and quadrature servo signals to provide a linear signal characterized by a position displacement greater than 50%.

* * * * *